UNITED STATES PATENT OFFICE.

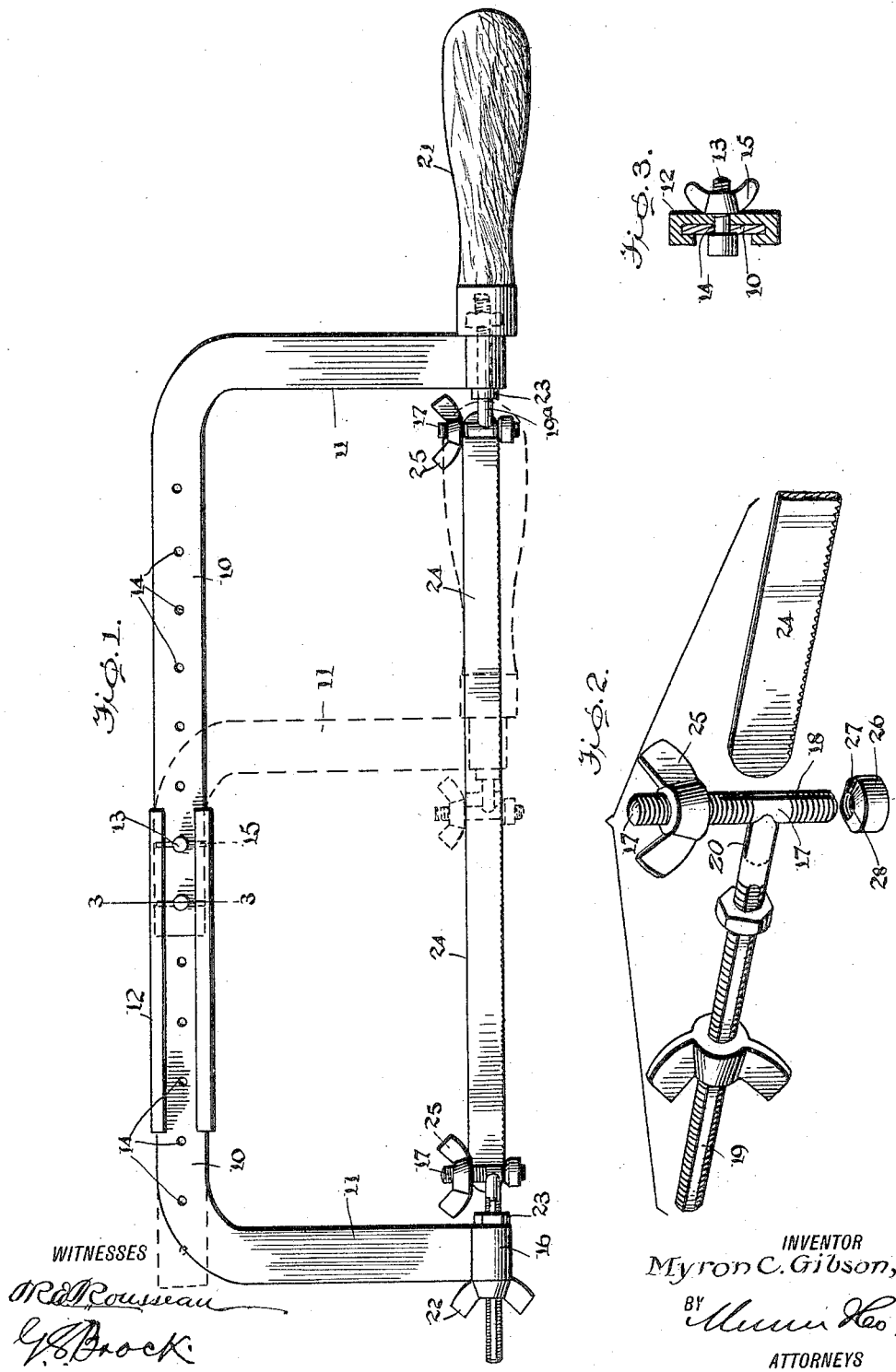

MYRON CARLOS GIBSON, OF LOS ANGELES, CALIFORNIA.

HACKSAW.

1,400,873.  Specification of Letters Patent.  Patented Dec. 20, 1921.

Application filed August 1, 1921. Serial No. 488,946.

*To all whom it may concern:*

Be it known that I, MYRON C. GIBSON, a citizen of the United States, and a resident of Los Angeles, in the county of Los Angeles and State of California, have invented certain new and useful Improvements in Hacksaws, of which the following is a specification.

This invention relates to hack saws and has reference more particularly to adjustable frame hack saws and the saw blade clamps carried thereby.

An object of the invention is to provide a hack saw frame that may be used with any usable length of saw blades.

Another is to provide a hack saw structure in which any portion of a broken saw blade may be used without any preparation of the ends of the pieces.

A further object is to provide a hack saw frame and blade clamps that will obviate the necessity of annealing the ends of the saw blades or providing the same with specific connecting means.

With these and other objects in view the invention consists in certain novel features of construction, arrangement and combination of parts as will be hereinafter fully described and pointed out in the claims, reference being had to the accompanying drawings in which, Figure 1 is a side elevation of a hack saw showing my improvements, Fig. 2 is a perspective view showing relative arrangement of certain details, Fig. 3 is a section on line 3—3 of Fig. 1.

Referring to the drawings and more specifically to Fig. 1 it will be noted that my hack saw frame comprises two L-shaped strips of metal each consisting of the horizontal body portion 10 and a leg 11 at one end, said legs being approximately perpendicular to the body portion. The L-shaped members are overlapped longitudinally and held in a slide jacket 12 the overlapped ends being locked in said slide by the bolts 13 passed through openings in the slide which register with openings 14 in the horizontal portions of the frame members; these bolts are held in place by the wing nuts 15 as indicated in Fig. 3.

The lower ends of the legs 11 are provided with eyes or passages 16 through which certain portions of the blade clamps are passed.

The clamps have a general cruciform or T-shape, the cross bar 17 of which is a threaded bolt having a slit 18 extending longitudinally into the same from one end, as shown in Fig. 2. From the bolt 17 and at right angles thereto extends the shank or stem 19 which is exteriorly threaded and designed to be passed through the eyes or sockets 16 at the ends of the legs 11. The stem 19 is integral with the bolt and the slit 18 of bolt 17 extends into the stem 19 a portion of its length as indicated by 20, the slits in 17 and 19 being made at the same time. As stated the stems 19 pass through the eyes or bearings 16 at the ends of the legs 11, 11, and at the end of the frame opposite the handle 21, the threaded stem is held in place by a winged nut 22 screwed on the stem at the outside of the leg and on the inside of the same by a set nut 23. The clamp bolt at the handle end of the frame is provided also with an integral slitted and threaded stem 19$^a$ which passes through the eye or bearing 16 engaging a nut rigidly seated in the smaller end of the handle which abuts the frame leg at that end. On this threaded stem is mounted a set nut 23$^a$.

The saw blade 24 may be made in any length most suitable to the manufacture and broken off to any usable length to be applied to the frame, the ends of these blades being free from annealing and without openings or projections to form connecting means.

The cross bolts 17 as before stated are slitted and are externally threaded at both ends. On the upper end is screwed a wing nut 25, and on the lower threaded end is to be screwed a nut 26 having its upper face 27 beveled or tapered the bevel giving the bolt opening a sharp edge 28 as shown in Fig. 2.

The ends of the hack saw blade are placed in the slits in the bolts 17 and extend into the slit in the stems 19; the beveled nuts are then run up on the bolts until the bevel edge 28 of the bolt opening of nut 26 engage in the teeth of the saw blade. The wing nuts 25 are then run down against the back edge of the blade and tightened securely holding the ends of the blade in place.

By tightening the wing nut 22 on the stem at the outside of the frame leg the saw blade is pulled tight to its proper tension. As the handle 21 screws on to the opposite clamp by means of a nut 29 set in the handle this can also be used to draw the saw blade to its proper tension. The set or lock nuts 23 and 23ª are run up against the frame legs and the blades are doubly held at their proper tension.

Now should a blade be broken, the longest piece can be replaced in the clamps and the frame shortened by means of the slide sleeve 12 and the bolts and the blade brought to its proper tension, and the sawing can be continued without having to get a new saw blade.

As there is no annealing of the ends of the blade and no drilling of holes therein, the only loss of time incurred is that which is taken in adjusting the frame to length of blade for bringing about the proper tension of the blade.

From the above it will be seen that saw blades can be made in quantities in any practical lengths and width and thickness and broken into any desired lengths and applied to the frames quickly for the desired use, without any special preparation of the ends.

It will also be noted that the blades can be turned to any angle which will permit of its use to cut a long piece of metal when the width of the piece of metal can go through the space between the top of the hack saw blade and the lower part of the frame.

Furthermore, the blade being placed within the slit or groove in the clamp bolt, does not have a tendency to twist, when the nuts which are used to tighten to the blade, are themselves tightened.

I claim:

1. A hack saw comprising a frame of substantially U form having legs provided with eyes or bearings at their lower ends, clamp bolts adjustably mounted in said eyes, said bolts also including slitted cross bolts, a saw blade the ends of which are mounted in the slits thereof, and adjustable means mounted on the cross bolts and bearing against the opposite edges of the saw blade to hold the same in the said slits.

2. A hack saw frame having two bent frame pieces located opposite each other, a flattened open tubular slide engaging and connecting the ends of said pieces, means for locking the slide and ends in adjusted position, slitted and adjustable clamp bolts carried at ends of the legs of said frame pieces, and adapted to grip the ends of a saw blade at its opposite edges.

3. A hack saw comprising an extensible frame of substantially U form having a leg at opposite ends, said legs having an eye or bearing at their lower end and clamp bolts adjustably carried in said eyes or bearings, and adapted to clamp the ends of a saw blade, said clamp bolts including a threaded bolt stem, a cross bolt integral with the stem and slitted through a portion of its length, said slits adapted to receive the ends of a saw blade, a bevel end nut threaded on the lower end of the cross bolt, the bevel end adapted to engage the teeth of the blade, and a wing nut threaded on the opposite end of the slitted bolt and engaging the back edge of the saw blade to force and hold the teeth of the blade into engagement with the bevel faced nut.

4. As a new article of manufacture a hack saw comprising an extensible frame of substantially U form, the legs at its opposite ends having bearings or eyes, T bolts adjustably mounted in said bearings, said bolts including a threaded stem and a threaded crosshead, said crossheads slitted longitudinally to receive the ends of a saw blade, a bevel faced nut mounted on said slitted crosshead at one side of the stem and a wing nut mounted on said slitted crosshead on the opposite side of the stem, and means engaging said stems for tensioning the saw blade when clamped in place by said bevel faced and wing nuts.

5. A hack saw as set forth in claim 4 and consisting further in a handle abutting the bearing or eye of one leg of the frame, said handle having a nut embedded in one end and engaging the threaded stem of the T bolt at that end of the frame, whereby the handle is held to the frame and may also be used to tension the saw blade.

MYRON CARLOS GIBSON.